Figure 1:
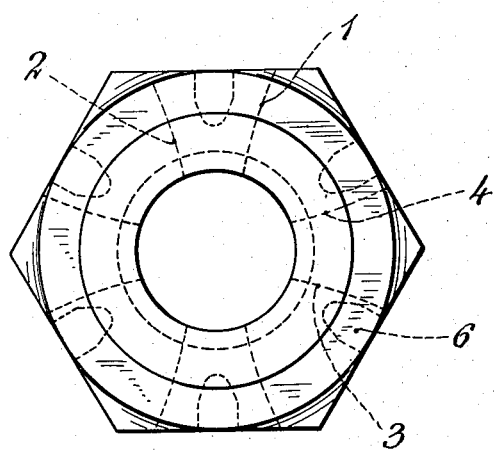

Jan. 27, 1942.      F. LEHRE      2,271,267
SELF-LOCKING NUT
Filed Jan. 19, 1940

Inventor:
F. Lehre
By E. F. Wenderoth
Atty

Patented Jan. 27, 1942

2,271,267

UNITED STATES PATENT OFFICE 2,271,267

SELF-LOCKING NUT

Frithjof Lehre, Oslo, Norway

Application January 19, 1940, Serial No. 314,713

2 Claims. (Cl. 151—21)

The present invention relates to an improvement in self-locking nuts of the type which is provided with incisions substantially at right angles to their axis, the object of said incisions being to permit a slight deformation of the nut when the same is being tightened, said deformation causing the threads of the nut to make a better engagement with the threads of the bolt.

Nuts of this type have been found to have the disadvantage that a permanent deformation of the nut may be caused in case too much force is used for tightening the nut.

This tendency to permanent deformation might be avoided by making the incisions sufficiently narrow but this again is very difficult to achieve for practical reasons as the cutting wheels, by means of which the incisions are made, must have a certain minimum thickness in order to be able to stand the strain of the cutting operation.

In accordance with the present invention the drawback above referred to is avoided by providing one or both of the opposed faces of the incisions with knobs or projections extending towards the opposite face of the incision and terminating at a very small distance from the latter.

By this means an excessive deformation of the nut during the tightening operation is avoided although the incisions have a sufficient width to permit the use of strong durable cutting wheels.

The knobs or projections referred to may preferably in accordance with a further feature of the invention be produced by pressing a cone-shaped tool into the material of the nut adjacent each of said incisions.

By the pressing action of said cone-shaped tool there is formed on the face of the incision an arc-shaped bulge, the summit of which is located at the desired small distance from the opposite face of the incision.

An embodiment of the present invention is illustrated on the drawing in connection with a self-locking nut similar in kind to that specified in my co-pending U. S. application No. 228,629.

It will be understood, however, that the use of the invention is not restricted to the particular kind of self-locking nut illustrated but that it may be applied to all self-locking nuts, the locking action of which is caused by incisions substantially at right angles to the nut axis.

Figure 2:
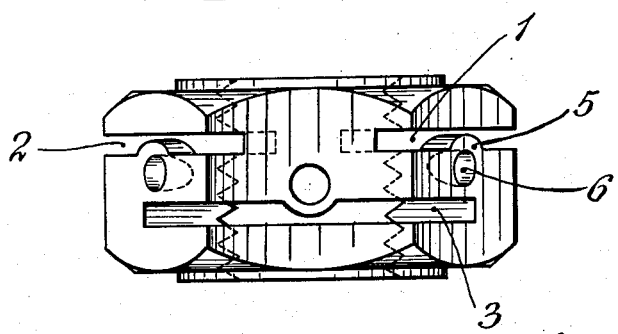

Figure 1 is a plan view and Figure 2 a side view of a self-locking nut.

As it will be seen from the drawing the nut is provided with incisions 1, 2, 3, 4 arranged in pairs and with each pair displaced at right angles to the other pair.

Bulges or knobs such as 5 are provided on the faces of said incisions extending to a point only slightly removed from the opposite face of the incision.

These bulges are caused by pressing a suitable cone-shaped tool (not shown) into the material of the nut adjacent each incision so as to form depressions 6 and cause the material between said depressions and the adjacent face of the incision to form an arc-shaped bulge.

I claim:

1. A self-locking nut having a body which is partially divided by means of a groove at right angles to the axis of the nut intersecting a substantial portion of the bore of the nut to form sections and one of the opposed faces of said groove having a projection to prevent deformation of said nut beyond the limit of elastic deformation.

2. A self-locking nut having a body which is partially divided by means of a groove at right angles to the axis of the nut intersecting a substantial portion of the bore of the nut to form sections and one of the opposed faces of said groove having an arc-shaped bulge to prevent deformation of said nut beyond the limit of elastic deformation.

FRITHJOF LEHRE.